United States Patent [19]

Weiser et al.

[11] Patent Number: 5,630,873

[45] Date of Patent: May 20, 1997

[54] METHOD OF PRODUCING DECLUSTERED ACETYL CELLULOSE FIBERS

[75] Inventors: Peter Weiser, Duisburg; Franz Meyers, Neukirchen-Vluyn; Jörg Hocken, Meerbusch-Osterrath; Heinrich Dumke, Moers, all of Germany

[73] Assignee: Metallgesellschaft Aktiengesellschaft, Frankfurt am Main, Germany

[21] Appl. No.: 609,295

[22] Filed: Mar. 1, 1996

Related U.S. Application Data

[62] Division of Ser. No. 282,496, Aug. 1, 1994, abandoned.

[30] Foreign Application Priority Data

Aug. 27, 1993 [DE] Germany .................. 43 28 851.0

[51] Int. Cl.$^6$ ...................................... C09J 4/00
[52] U.S. Cl. .................. 106/417; 106/447; 106/170.15; 106/170.26; 427/170; 57/295; 57/258; 264/13; 264/170; 264/211; 264/328.18; 524/41

[58] Field of Search ...................... 106/166, 192, 106/203, 204, 447; 427/120; 57/295, 258; 264/13, 170, 211, 328.18

[56] References Cited

U.S. PATENT DOCUMENTS

| | | | |
|---|---|---|---|
| 1,902,529 | 3/1933 | Stockly et al. | 106/166 |
| 3,607,328 | 9/1971 | Rose et al. | 264/188 |
| 3,616,182 | 10/1971 | Ando et al. | 264/211 |
| 4,044,541 | 8/1977 | Ikeda | 57/287 |
| 5,236,645 | 8/1993 | Jones | 264/211 |

*Primary Examiner*—Mark L. Bell
*Assistant Examiner*—Scott L. Hertzog
*Attorney, Agent, or Firm*—Felfe & Lynch

[57] ABSTRACT

A delustering composition for acetyl cellulose fibers is described which contains 15 to 85% by weight $TiO_2$, 15 to 85% by weight paraffin oil and 0.5 to 10% by weight dispersing agent. Furthermore, a method for producing the delustering composition and also the use thereof for delustering acetyl cellulose fibers is described. Finally, the use of the delustered acetyl cellulose fibers in the production of cigarette filters and textile products is described.

5 Claims, No Drawings

METHOD OF PRODUCING DECLUSTERED ACETYL CELLULOSE FIBERS

This is a division of application Ser. No. 08/282,496, filed Aug. 1, 1994, abandoned.

BACKGROUND TO THE INVENTION

The subject of the present invention is a delustering composition for acetyl cellulose fibers. The subject of the present invention is furthermore a method for the production of the delustering composition and a method for delustering acetyl cellulose fibers and also the use of the delustered acetyl cellulose fibers in the production of cigarette filters and textile products.

The delustering of acetyl cellulose fibers may be effected using various methods. Two possible ways of delustering acetyl cellulose fibers are known from Kronos Leitfaden, Grundlagen and Anwendung von Kronos Titandioxid, published by Kronos Titanfabriken, 1967. One possible method consists in producing acetate chips having a relatively high content of $TiO_2$ pigment (30 to 50% by weight $TiO_2$ pigment). To this end, the $TiO_2$ pigment is thoroughly dispersed in the acetyl cellulose in a heatable rolling mill. First of all, some diacetone alcohol and water is added to the mixture, in order to obtain a plastic substance. During the mixing process, the alcohol and the water evaporate, so that finally a strip of acetyl cellulose is produced in which the $TiO_2$ pigment is regularly distributed. The chips produced therefrom can either be mixed with non-pigmented acetyl cellulose and then dissolved in acetone, but they may also be introduced directly into a spinning solution. Finally, there is the possibility of producing from these chips a solution of acetyl cellulose in acetone with a high $TiO_2$ pigment content and not injecting this concentrate into the main stream of the spinning solution until shortly before the spinnerets. With this method, the shear force can be only poorly regulated.

The second possibility consists in producing a concentrate of $TiO_2$ pigment in dilute acetyl cellulose solution with the aid of a suitable grinding apparatus, e.g. a ball mill. The solution contains approximately 7% by weight acetyl cellulose and approximately 25% by weight $TiO_2$ pigment. After the dispersing operation, coarse contents of the pigment suspension are filtered off. Approximately 25% cellulose in acetone is introduced into an acetyl cellulose spinning solution and is mixed thoroughly therewith. This possible method of delustering acetyl cellulose fibers has the disadvantage that $TiO_2$ tends to flocculate and be deposited in the acetate solutions, which causes further disadvantages.

SUMMARY OF THE INVENTION

It is an object of the present invention to provide a delustering composition with which acetyl cellulose fibers can be delustered economically and in environmentally-friendly manner without great expense.

The object of the present invention is achieved by a delustering composition which contains 15 to 85% by weight $TiO_2$, 15 to 85% by weight paraffin oil and 0.5 to 10% by weight dispersing agent.

The delustering composition according to the invention is introduced completely without dispersing steps by stirring into the spinning solution used to produce the acetyl cellulose fibers. The term "solution" means a mixture of a solvent and acetyl cellulose which is homogenous and liquid to such an extent that it can be passed through a spinneret. The delustering composition according to the invention has the necessary fineness and compatibility for the delustering of acetyl cellulose fibers. Furthermore, the delustering composition has a very low tendency to flocculation, owing to the addition of the dispersing agent. There are no stability problems with the delustering composition. A delustering composition containing about 50% by weight $TiO_2$ has a storage stability of several months.

DESCRIPTION OF PREFERRED EMBODIMENTS

A preferred embodiment of the invention is that the delustering composition contains 40 to 75% by weight $TiO_2$, 23 to 59% by weight paraffin oil and 1 to 2.5% by weight dispersing agent. This preferred delustering composition has particularly good fineness and a very low tendency to flocculation.

The viscosity of the delustering composition is preferably 0.1 to 10 Pa.s [Brookfield RVF (100 rpm)]. The delustering composition according to the invention has particularly good properties for the delustering of acetyl cellulose fibers in this range of viscosity.

A preferred embodiment of the invention is that the solids content in the delustering composition is 50 to 70% by weight. The delustering composition according to the invention in this range of the solids content demonstrates particularly good filter test values and at the same time a very low tendency to flocculation. The delustering composition demonstrates very good filter test values and a low tendency to flocculation in particular when the content of the dispersing agent is 1.5 to 2% of the solids content.

A preferred embodiment of the invention is that $TiO_2$ has a particle size of 0.2 to 0.5 μm. In this range of particle size of the $TiO_2$ pigment, very good results are achieved in the delustering of acetyl cellulose fibers using the delustering composition according to the vention.

A preferred embodiment of the invention is that the dispersing agent is polyacrylate, lecithin, lecithin derivative, fatty acid or fatty acid derivative. When the preferred dispersing agent is used, the delustering composition according to the invention has a longer storage stability and very good filter test values and also a very low tendency to flocculation.

The delustering composition is produced according to the invention in that a) a dispersing agent is mixed with paraffin oil;

b) titanium dioxide is added in batches with stirring to the mixture under (a);

c) the suspension under (b) is dispersed;

d) the dispersed suspension under (c) is continuously bead-ground.

In the production of the delustering composition according to the invention, advantageously all known wet-dispersion and/or classifying steps can be used. The fineness or the oversize content can thus be optimised in the delustering composition. The delustering composition demonstrates excellent filter test values in particular after the bead-grinding under (d) and a very low tendency to flocculation compared with a delustering composition which has only been dispersed in a dissolver. In the delustering of acetyl cellulose fibers by means of the delustering composition according to the invention, no constituents are left over which have to be disposed of or dumped.

Depending on the solids content and on the quantity of the dispersing agent, relative to the solids content, the delustering composition may be a liquid, a low-viscosity, scarcely thixotropic slurry, a slightly to strongly thixotropic slurry (stable dispersed suspension) or a slightly to strongly thixotropic paste.

According to the invention, the use of the delustering composition according to the invention is provided for directly stirring into the spinning solution used for producing the acetyl cellulose fibers. The method according to the invention for delustering acetyl cellulose fibers by means of the delustering composition according to the invention overcomes the disadvantages of the conventional methods for the delustering of acetyl cellulose fibers described first hereinbefore.

Furthermore, provision is made for the use of the acetyl cellulose fibers delustered according to the invention in the production of cigarette filters and textile products.

The invention will be explained with reference to the examples.

EXAMPLE 1

3920 g paraffin oil (Shell Ondina Oil G17)[1] were poured into an open vessel. 80 g of a polyacrylate (TEGOMER AC 100)[2] were added thereto. The mixture was stirred in a dissolver at low speed. A total of 4000 g of a $TiO_2$ pigment having a particle size of 0.3 to 0.4 μm was added to the mixture in batches during stirring. The suspension, which contained 50% by weight solids, was dispersed for 20 minutes at a peripheral speed of about 14.5 m/s with a toothed-disc diameter of 7 cm. The dispersed suspension (slurry) was then continuously bead-ground in a 1.4 l-capacity bead mill at a throughput rate of about 15 l/h. Once the feed pump had been set to the desired throughput rate, first runnings of about 2 l were removed, which could be recycled into the production of the delustering composition. About 3 l bead-ground dispersed suspension (slurry) were obtained. The resulting composition had the following properties:

| | |
|---|---|
| Solids content: | 50% by weight |
| Dispersing agent: | 2% by weight |
| Viscosity: | 2480 mPa · s [Brookfield RVF (100 rpm)] |
| Fineness: | high |
| Sieve residue[5]: | <0.001% by weight |
| Tendency to flocculation: | very low |
| Colour: | white |
| Storage stability: | >6 months |
| Slurry stability in acetone (2% by weight $TiO_2$)[6]: | >1 month |
| Nature: | thixotropic slurry |

The delustering compositions of Examples 2 to 6 were produced according to the method described in Example 1.

1) Shell AG
2) Goldschmidt AG
3) Lucas Meyer GmbH & Co. KG
4) ICI Ltd.
5) Sieve residue of a slurry, consisting of 20% by weight solids and 80% by weight paraffin oil, for a sieve having a mesh size of 45 μm.
6) $TiO_2$ content in the acetone slurry

| | Examples | | | | |
|---|---|---|---|---|---|
| | 2 | 3 | 4 | 5 | 6 |
| Dispersing agent | Polyacrylate TEGOMER AC 100[2] | Lecithin Lipopur[3] | Polyacrylate TEGOMER AC 100[2] | Polyacrylate TEGOMER AC 100[2] | Fatty acid Solsperse 3000[4] |
| Solids content (% by weight) | 70 | 65 | 75 | 80 | 50 |
| Dispersing agent (% by weight) | 2 | 2 | 4 | 4 | 2 |
| Viscosity (mPa · s) | — | 1070 | — | — | 150 |
| Fineness of sieve residue[5] (% by weight) | high <0.001 | high <0.001 | high <0.001 | high <0.001 | high <0.001 |
| Tendency to flocculation | very low | very low | low | low | low |
| Colour | white | white | white | white | white |
| Storage stability | >6 months | >6 months | >6 months | >6 months | about 3 months |
| Slurry stability in acetone (2% by weight $TiO_2$)[6] | >1 month | >1 month | >1 month | >1 month | >1 month |
| Nature | strongly thixotropic, highly viscous slurry | thixotropic slurry | strongly thixotropic paste | thixotropic paste | low-viscosity, scarcely thixotropic slurry |

What is claimed is:

1. A method of producing a delustered acetyl cellulose fiber comprising: stirring a delustering composition which contains 40 to 75 wt.-% $TiO_2$, 23 to 59 wt.-% paraffin oil and 1 to 2.5 wt.-% dispersing agent into a spinning solution used for producing acetyl cellulose fibers; and producing the acetyl cellulose fibers from the spinning solution.

2. The method of claim 1, wherein the solids content in the delustering composition is 50 to 70 wt.-%.

3. The method of claim 1, wherein the $TiO_2$ in the delustering composition has a particle size of 0.2 to 0.5 μm.

4. The method of claim 1, wherein the dispersing agent in the delustering compostion is selected from the group consisting of polyacrylate, lecithin, lecithin derivative, fatty acid and a fatty acid derivative.

5. The method of claim 1, wherein the delustering composition is produced by
   (a) mixing a dispersing agent with paraffin oil to form a mixture;
   (b) adding titanium dioxide in batches with stirring to the mixture of (a) to form a suspension;
   (c) dispersing the suspension of (b); and
   (d) continuously bead-grinding the dispersed suspension of (c).

* * * * *